United States Patent
Hsieh et al.

(10) Patent No.: US 7,912,312 B2
(45) Date of Patent: Mar. 22, 2011

(54) IMAGE PROCESSING CIRCUIT AND METHOD THEREOF

(75) Inventors: Chun-Hsing Hsieh, Hsin-Chu (TW); Yen-Hsing Wu, Hsin-Chu Hsien (TW); Chi-Feng Wang, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1082 days.

(21) Appl. No.: 11/624,205

(22) Filed: Jan. 17, 2007

(65) Prior Publication Data

US 2007/0172142 A1    Jul. 26, 2007

(30) Foreign Application Priority Data

Jan. 20, 2006    (TW) ................................ 95102355 A (51) Int. Cl.
*G06K 9/40*    (2006.01)
*G06K 9/48*    (2006.01)
(52) U.S. Cl. ........................ 382/269; 382/199
(58) Field of Classification Search .......... 382/180–181, 382/199, 254, 266, 269
See application file for complete search history.

(56) References Cited

U.S. PATENT DOCUMENTS

| | | | | |
|---|---|---|---|---|
| 5,293,579 A | * | 3/1994 | Stockholm | 382/269 |
| 5,357,583 A | * | 10/1994 | Sato et al. | 382/269 |
| 5,469,223 A | * | 11/1995 | Kimura | 348/581 |
| 5,867,142 A | * | 2/1999 | Thieret | 345/611 |
| 6,608,942 B1 | * | 8/2003 | Le | 382/279 |
| 6,879,733 B2 | | 4/2005 | Shu et al. | |
| 6,956,976 B2 | * | 10/2005 | Perlmutter et al. | 382/266 |
| 7,088,351 B2 | * | 8/2006 | Wang | 345/204 |
| 7,505,083 B2 | * | 3/2009 | Zhu | 348/607 |
| 2004/0174350 A1 | * | 9/2004 | Wang | 345/204 |
| 2004/0179140 A1 | | 9/2004 | Ku | |
| 2004/0213480 A1 | | 10/2004 | Morton | |
| 2007/0070244 A1 | * | 3/2007 | Wyman et al. | 348/448 |

FOREIGN PATENT DOCUMENTS

| | | |
|---|---|---|
| TW | 454153 | 9/2001 |
| TW | 488544 | 5/2002 |
| TW | 588321 | 5/2004 |
| TW | I227632 | 2/2005 |
| WO | 2005/036468 A1 | 4/2005 |

* cited by examiner

*Primary Examiner* — Daniel G Mariam
(74) *Attorney, Agent, or Firm* — Thomas, Kayden, Horstemeyer & Risley, LLP (57) ABSTRACT

An image processing circuit for processing at least one jagged edge in an image represented by an input video signal. The image processing circuit includes: a detection module for detecting an edge by labeling a specific portion within input data carried by the input video signal to indicate whether the specific portion corresponds to a specific edge and further generates a detection result; a line buffer for temporarily storing input data carried by the input video signal; and a processing unit, coupled to the detection module and the line buffer, for processing the input data according to the detection result to output an output video signal.

21 Claims, 5 Drawing Sheets

| 5 | 3 | 0 | 132 | 255 |
|---|---|---|---|---|
| 0 | 0 | 0 | 156 | 255 |
| 0 | 2 | 0 | 179 | 255 |
| 0 | 13 | 38 | 213 | 255 |
| 0 | 15 | 96 | 238 | 255 |

IMAGE PROCESSING CIRCUIT AND METHOD THEREOF

BACKGROUND OF THE INVENTION

1. Field of the Invention

The present invention relates to image processing, and more particularly, to image processing circuits and methods capable of reducing or removing jagged phenomenon from an edge of an image of an input video signal.

2. Description of the Prior Art

Figure 1:
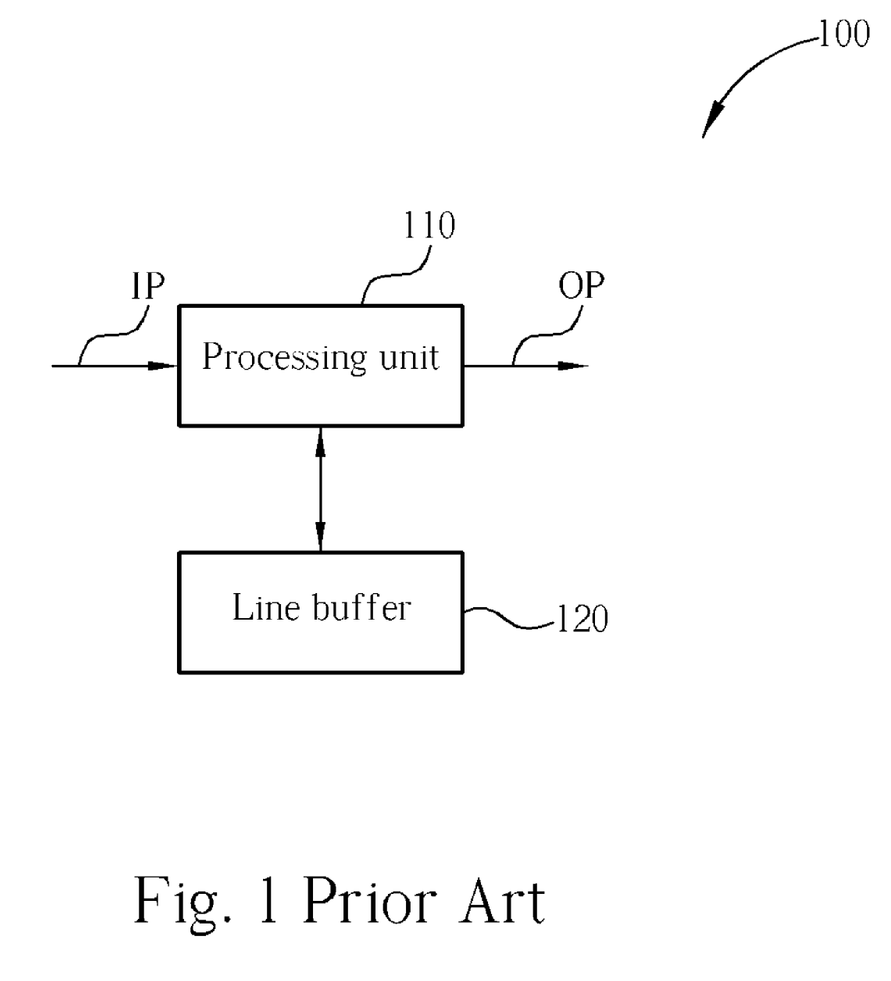
FIG. 1 is a diagram of an image processing circuit according to the prior art.

Jagged phenomenon sometimes occurs around edges of video objects within images. According to the prior art, a method for reducing or removing the jagged phenomenon usually utilizes low pass filtering to process the whole image. As shown in FIG. 1, an image processing circuit 100 according to the prior art comprises a processing unit 110 and a line buffer 120. The line buffer 120 is utilized for temporarily storing input data carried by an input video signal IP (for example, image data of a plurality of scan lines), while the processing unit 110 is utilized for performing low pass filtering on the input data to generate an output video signal OP. Thus, the edges in the image represented by the output video signal OP become smooth. However, the image processing circuit 100 according to the prior art tends to make the whole image blurred.

SUMMARY OF THE INVENTION

It is an objective of the claimed invention to provide image processing circuits and methods to reduce or remove jagged phenomenon from an edge of an image represented by an input video signal.

It is also an objective of the claimed invention to provide image processing circuits and methods to process at least one jagged edge in an image represented by an input video signal.

According to one embodiment of the claimed invention, an image processing circuit for processing at least one jagged edge in an image represented by an input video signal is disclosed. The image processing circuit comprises a detection module. The detection module comprises: an edge detector for detecting an edge according to the input video signal and labeling a specific portion within input data carried by the input video signal to indicate whether the specific portion corresponds to the edge; and a jag detector for detecting the edge according to the labeling result of the specific portion and a plurality of predetermined patterns to generate a detection result. The image processing circuit further comprises: a first line buffer for temporarily storing the input data; and a processing unit, coupled to the detection module and the first line buffer, for processing the input data according to the detection result to output an output video signal.

According to one embodiment of the claimed invention, an image processing method for processing at least one jagged edge in an image represented by an input video signal is disclosed. The image processing method comprises: detecting an edge according to the input video signal and labeling a specific portion within input data carried by the input video signal to indicate whether the specific portion corresponds to the edge; detecting the edge according to the labeling result of the specific portion and a plurality of predetermined patterns to generate a detection result; temporarily storing the input data; and processing the input data according to the detection result to output an output video signal.

According to one embodiment of the claimed invention, an image processing circuit for processing an input video signal is disclosed. The image processing circuit comprises a detection module. The detection module comprises: a pixel value difference detector for generating a plurality of labeling values according to values of a plurality of pixels of the input video signal, the labeling values corresponding to the pixels; and a pattern detector for detecting whether the labeling values match at least one predetermined pattern to generate a detection result. The image processing circuit further comprises: a first line buffer for temporarily storing the input video signal; and a processing unit, coupled to the detection module and the first line buffer, for processing the input video signal according to the detection result to output an output video signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
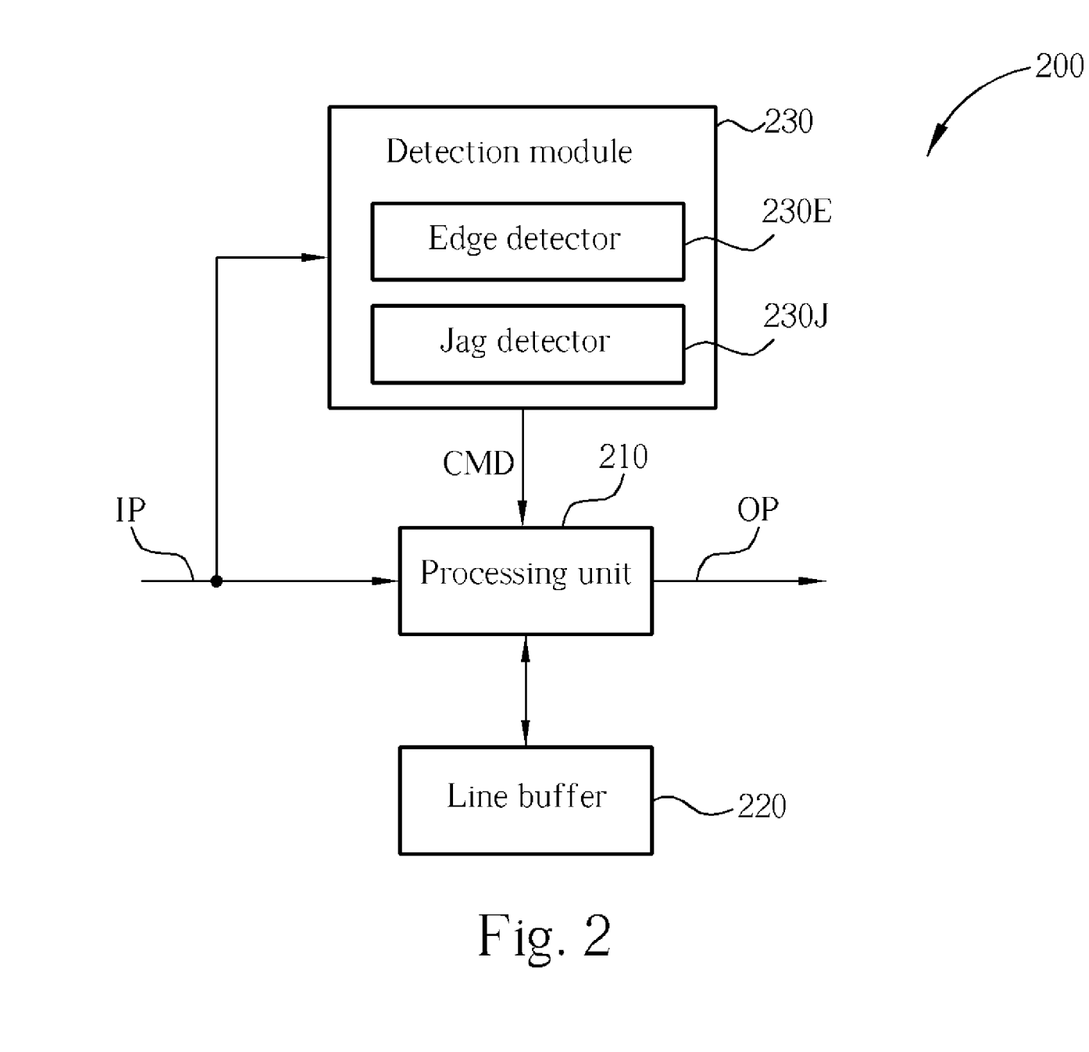
FIG. 2 is a diagram of an image processing circuit according to an embodiment of the present invention.

Reference is made to FIG. 2, which is a diagram of an image processing circuit 200 according to one embodiment of the present invention. The image processing circuit 200 is capable of processing at least one jagged edge in an image represented by an input video signal IP. The image processing circuit 200 comprises a processing unit 210, a line buffer 220, and a detection module 230, where the detection module 230 further comprises a pixel value difference detector and a pattern detector. As shown in FIG. 2, the pixel value difference detector in this embodiment is an edge detector 230E, and the pattern detector in this embodiment is a jag detector 230J. In this embodiment, the edge detector 230E and the jag detector 230J are integrated into a single module, i.e. the detection module 230.

The edge detector 230E is capable of detecting an edge according to the input video signal IP, and labels a specific portion within the input data carried by the input video signal IP to indicate whether the specific portion corresponds to the edge. The input data comprises values of a plurality of pixels, where the values can be referred to as pixel values. According to this embodiment, the specific portion mentioned above can be a plurality of pixels corresponding to one or more scan lines. That is, the specific portion corresponds to a pixel region, and the pixel region comprises a plurality of pixels. In addition, the edge detector 230E is capable of labeling the specific portion as one of a plurality of types. For example: a light-to-dark edge, a dark-to-light edge, or a smooth region. Here, if a first pixel location is labeled as an index value 0 representing a smooth region, the first pixel location can be skipped without processing. Conversely, if a second pixel location is labeled as an index value 1 representing a dark-to-light edge, or an index value 3 representing a light-to-dark edge, the second pixel location may need processing. For example, the processing unit 210 may perform an interpolation operation on the second pixel or other pixel(s) near or adjacent to the second pixel. These index values can also be referred to as labeling values.

According to this embodiment, the edge detector 230E determines the labeling result of the specific portion by detecting or calculating the difference between two pixel values of certain two pixels of the same scan line. For example, (p[L]-p[L-1]), (p[L]-p[L+1]), (p[L]-p[L+2]), ..., etc., where p[L-1], p[L], p[L+1], ..., etc. represent pixel values, and L represents the location of the pixel corresponding to the specific portion in the scan line. The edge detector 230E may detect whether (p[L]-p[L-1]), (p[L]-p[L+1]), and (p[L]-p[L+2]) reach a certain threshold(s), respectively, to determine the labeling result of the specific portion. In addition, the labeling result of the specific portion (e.g., the index values 0, 1, or 3) can be recorded in an index array comprising a plurality of indexes, where the index array is stored in a storage unit (not shown) within the detection module 230. Whether the storage unit is positioned within or outside the edge detector 230E, or positioned within or outside the jag detector 230J does not affect the implementation of the present invention. It is noted that according to one embodiment of the present invention, not only the pixels labeled as the index value 1 or the index value 3 will be processed with interpolation, but also some other pixels labeled as other values will be processed with interpolation. That is, neighboring pixels of the edge(s) in the image can be processed to reduce or remove the jagged phenomenon of the edge(s). For example, pixels on certain edge(s) represented by a series of pixels labeled as the index value 1 or the index value 3, and neighboring pixels of the certain edge(s) can be processed.

Figure 3:
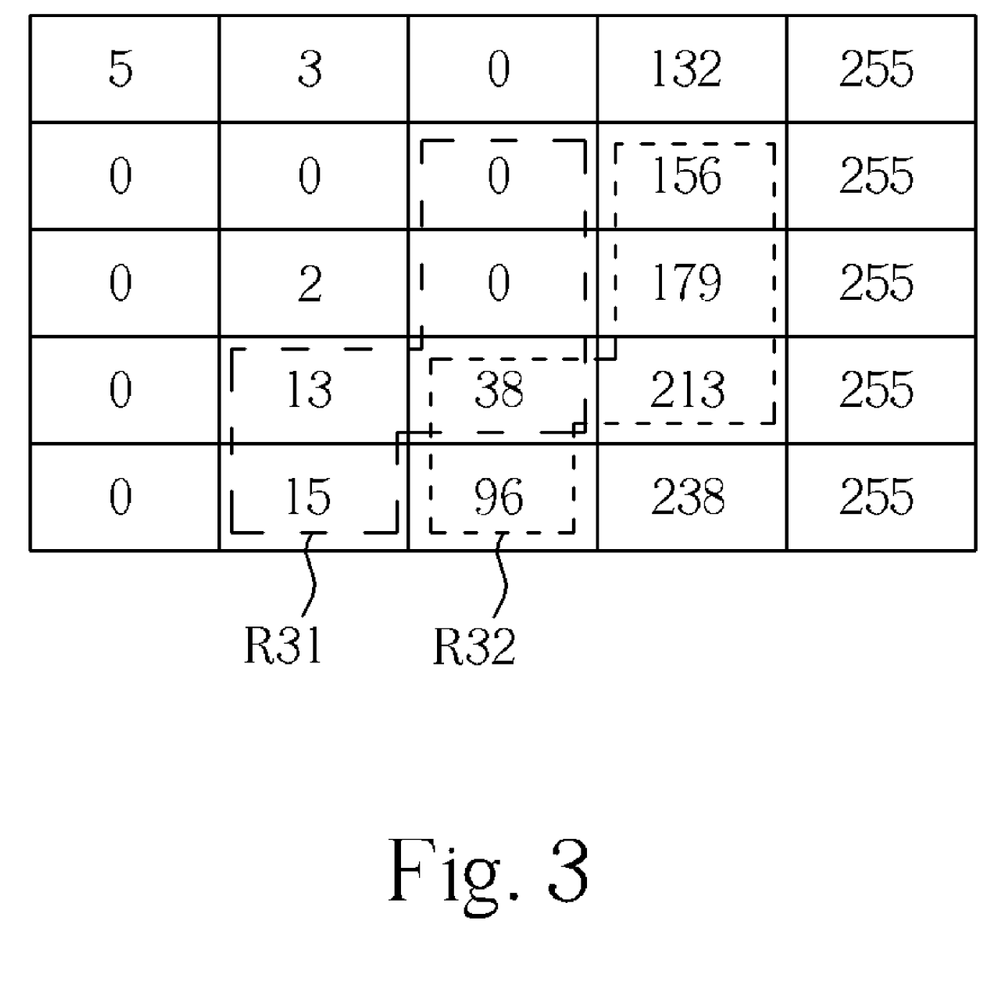
FIG. 3 is a diagram of a portion within image data according to an embodiment of the present invention.
Figure 4:
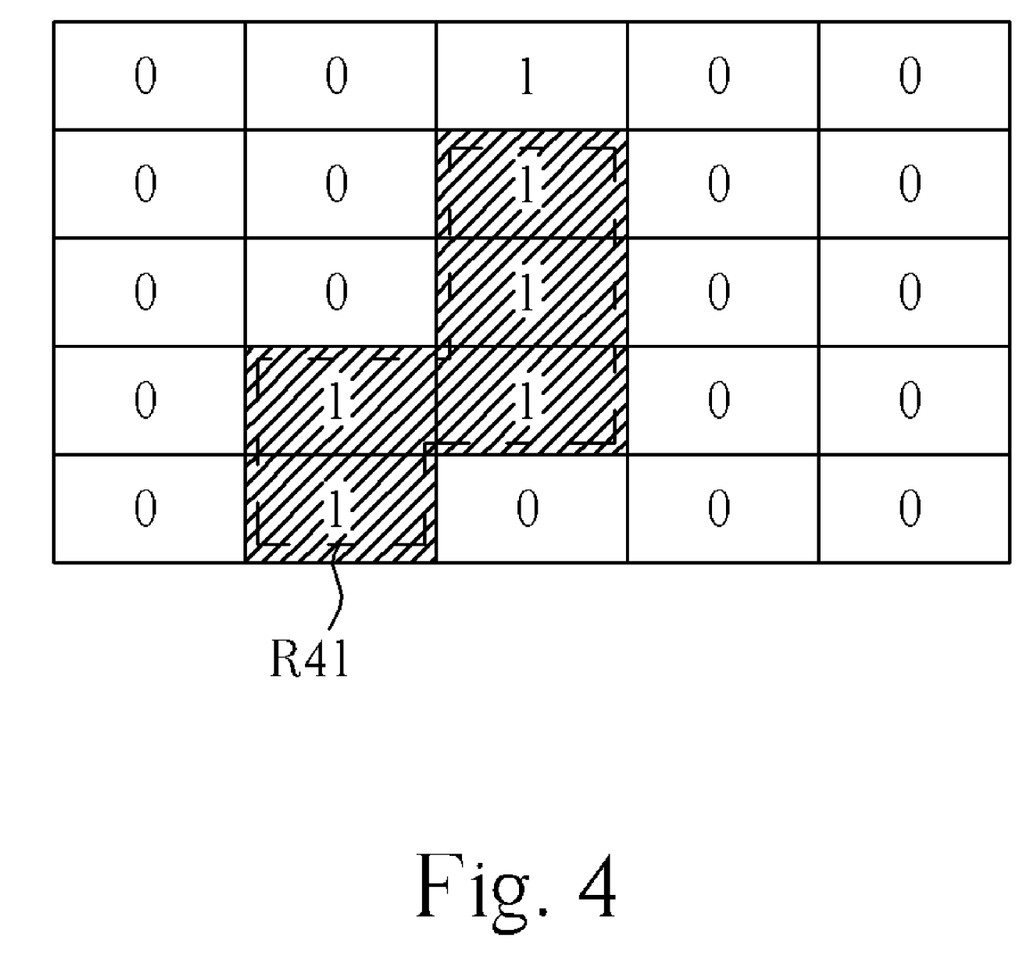
FIG. 4 is a diagram of an index array corresponding to the image data shown in FIG. 3 according to an embodiment of the present invention.

Please refer to FIG. 3 and FIG. 4. FIG. 3 is a diagram of a portion of image data according to this embodiment, while FIG. 4 is a diagram of the index array corresponding to the image data shown in FIG. 3. In the 5-by-5 sized array shown in FIG. 3, each value represents a pixel value, which can be one of 256 gray levels from 0 to 255, where the gray level 0 represents the minimum gray level and the gray level 255 represents the maximum gray level. According to this embodiment, the detection module 230 performs the labeling of types corresponding to the pixels by detecting whether the difference between two pixel values of two specific pixels within the same scan line satisfies a specific rule to generate the index array shown in FIG. 4. For example, the image represented by the image data shown in FIG. 3 varies from dark to light along the direction from left to right, and there exists an edge that is almost vertical in the center of the image. As a result, a series of index values 1 that are distributed almost vertically appear in the center of the index array as shown in FIG. 4, and a plurality of index values 0 representing smooth region(s) appear around the left and right of the index array. Similarly, if another image represented by some other image data varies from light to dark along the direction from left to right, and if there exists an edge that is almost vertical in the center of the image, a series of index values 3 that are distributed almost vertically appear in the center of the index array corresponding to the "some other image data" mentioned above. A plurality of index values 0 representing smooth region(s) will appear around the left side and the right side of the index array.

In this embodiment, each index in the index array represents the labeling result of one pixel. According to an implementation choice of this embodiment, the edge detector 230E may directly output the labeling result of the specific portion into the jag detector 230J for reference, such that the jag detector 230J may record the labeling result mentioned above in the index array. According to an implementation choice of this embodiment, the edge detector 230E may record the labeling result of the specific portion in the index array for retrieving by the jag detector 230J.

The jag detector 230J detects the edge according to the labeling result of the specific portion (e.g. the index values 1 in the index array shown in FIG. 4) and a plurality of predetermined patterns to generate a detection result. The processing unit 210 processes the input data that is temporarily stored in the line buffer 220 according to the detection result to generate and output an output video signal OP, where output data carried by the output video signal OP comprises processed pixel values. Here, the detection result represents whether the labeling result matches a specific predetermined pattern of the predetermined patterns. For example, the predetermined pattern illustrated with dashed lines R41 shown in FIG. 4 corresponds to the shape formed with the shaded portions. According to this embodiment, the predetermined patterns respectively represent a plurality of various kinds of pixel value distributions, the specific predetermined pattern represents a specific pixel value distribution, and the processing unit 210 processes the input data according to the specific pixel value distribution to reduce or remove the jag of the edge. Taking the index array shown in FIG. 4 as an example, the specific pixel value distribution has a shape as illustrated with the dashed lines R41. The jag detector 230J detects whether a distribution of certain index values 1 or 3 matches the specific pixel value distribution according to the index values totaling a number of 5 by 5 in the index array shown in FIG. 4. For example, the jag detector 230J detects that there is an index value 0 under the series of index values 1 distributed vertically in the center, such that the jag detector 230J further detects whether any index value 1 exists in the lower left or lower right of the series of index values 1 distributing vertically in the center. In the situation as shown in FIG. 4, the jag detector 230J detects that two index values 1 distributed vertically exist in the lower left of the series of index values 1 in the center, and that a combination of the two index values 1 and the series of index values 1 in the center matches the specific pixel value distribution as illustrated with the dashed lines R41 shown in FIG. 4. In general, the jag detector 230J is the pattern detector as mentioned above, where the pattern detector is utilized for detecting whether the index values match at least one predetermined pattern to generate a detection result.

By utilizing a command CMD corresponding to the detection result, the processing unit 210 may derive the detection result from the jag detector 230J in real time, so as to determine whether the input data matches the specific predetermined pattern. In this embodiment, the predetermined patterns respectively correspond to a plurality of slopes, which can be represented by a plurality of predetermined pattern arrays. These predetermined pattern arrays respectively represent certain kinds of specific pixel value distributions. For example, a distribution of three successive pixels distributed vertically (along a vertical line, whose slope approaches infinity), a distribution of three successive pixels distributed horizontally (along a horizontal line, whose slope is zero), a distribution of four successive pixels distributed from upper right to the lower left (along a 45-degree-inclined line whose slope is one), a distribution of four successive pixels distributed from upper right to the lower left (along a 45-degree-inclined line whose slope is minus one), and a distribution of the five pixels indicated by the dashed lines R41 shown in FIG. 4 (along a 30-degree-inclined line whose slope is the square root of three, i.e. 1.732 approximately). The jag detector 230J compares the index array with any of the predetermined pattern arrays. Once the index array matches one of the predetermined pattern arrays, the slope of the edge is found to be substantially equal to a specific slope corresponding to the specific predetermined pattern of the slopes mentioned above. Thus, the detection result indicates the slope of the edge. As a result, the processing unit 210 processes the input data according to the specific pixel value distribution to reduce or remove the jag of the edge.

According to this embodiment, the processing unit 210 performs the interpolation operation according to the specific pixel value distribution corresponding to the specific slope to change or adjust the image data that is corresponding to a plurality of scan lines and temporarily stored in the line buffer 220, especially the pixel values of the neighboring pixels of the edge, in order to reduce or remove the jag. The storage volume of the line buffer 220 does not necessarily require a large size. More particularly, when the image processing circuit 200 is processing an edge that is almost vertical, the number of scan lines corresponding to the data temporarily stored in the line buffer 220 is minor. If the line buffer 220 is a 5-line buffer, the image processing circuit 200 may process image data corresponding to six scan lines. In a simplified variation of this embodiment, the line buffer 220 is a 1-line buffer.

In addition, the processing unit 210 of this embodiment processes the input data by selecting a function from a plurality of predetermined functions according to the detection result to output the output video signal OP. The predetermined functions can be utilized for implementing the interpolation operation corresponding to the predetermined patterns, i.e. the interpolation operation corresponding to the plurality of kinds of pixel value distribution. For example, a specific function is utilized for performing the interpolation operation according to certain pixels at specific relative locations of the specific pixel value distribution, to correct certain pixel(s) at other specific relative location(s) of the specific pixel value distribution. In the situation shown in FIG. 4, once the detection result is derived, the processing unit 210 may have to determine whether the input data matches the specific predetermined pattern. Here, the specific predetermined pattern corresponds to the 30-degree-inclined line whose slope is the square root of three (i.e. 1.732 approximately), meaning the edge locally runs approximately along the 30-degree-inclined line. As a result, the processing unit 210 may perform the interpolation operation on the pixel values of the pixels indicated by dashed lines R31 shown in FIG. 3 by selecting a certain predetermined function corresponding to the pixel value distribution as illustrated with the dashed lines R41 to reduce or remove the jag of the edge. In this embodiment, the processing unit 210 increases the pixel value 38 enclosed by the dashed lines R31 and increases the pixel value 0 above the pixel value 38, where the increment for the pixel value 38 is slightly greater than the increment for the pixel value 0. As a result, the processing unit 210 may reduce or remove the jag corresponding to the pixel value 38. In addition, the processing unit 210 decreases the pixel value 13 enclosed by the dashed lines R31 to reduce or remove the jag corresponding to the pixel value 13.

The processing unit 210 is capable of performing the interpolation operation according to two pixel values of two pixels that are adjacent to the pixels indicated by the dashed lines R31 and at a greater distance from each other, to correct or adjust the pixel values to be adjusted as described above. For example, regarding the correction of the pixel value 38 and the pixel value 0 mentioned above, the processing unit 210 may perform the interpolation operation according to the pixel value 96 shown in FIG. 3 and the upmost pixel value 0 enclosed by the dashed lines R31. For example, regarding the correction of the pixel value 13 mentioned above, the processing unit 210 may perform the interpolation operation according to the pixel value 15 and the pixel value 2 shown in FIG. 3. According to this embodiment, the interpolation operations are performed according to uncorrected pixel values.

In a different variation of this embodiment, regarding the index array derived from detection each time (e.g., the index array having the 5-by-5 size as shown in FIG. 4), the processing unit 210 may adjust only one pixel value, which is the one corresponding to the center of the index array (e.g., the pixel value 0 right in the center of the 5-by-5 sized array shown in FIG. 3). This variation illustrates a simplified implementation method.

In another variation of this embodiment, the processing unit 210 is capable of performing the interpolation operation on the pixel values enclosed by the dashed lines R32 shown in FIG. 3 by selecting a certain predetermined function corresponding to the pixel value distribution as illustrated with the dashed lines R41, to reduce or remove the jag of the edge. In this variation, the brighter region in the right side as shown in FIG. 3 can be considered as a video object, so the pixels indicated by the dashed lines R32 are considered to be the edge of the video object. Therefore, the processing unit 210 processes the pixels indicated by the dashed lines R32.

In yet another variation of this embodiment, the processing unit 210 comprises a filter bank, having a plurality of filters respectively representing the predetermined functions.

In another embodiment of the present invention, the edge detector 230E and the jag detector 230J can be implemented as two modules coupled to each other.

In another embodiment of the present invention, the processing unit 210 and at least one portion of the detection module 230, for example, the edge detector 230E, the jag detector 230J, or the whole detection module 230, can be integrated into a single module.

Figure 5:
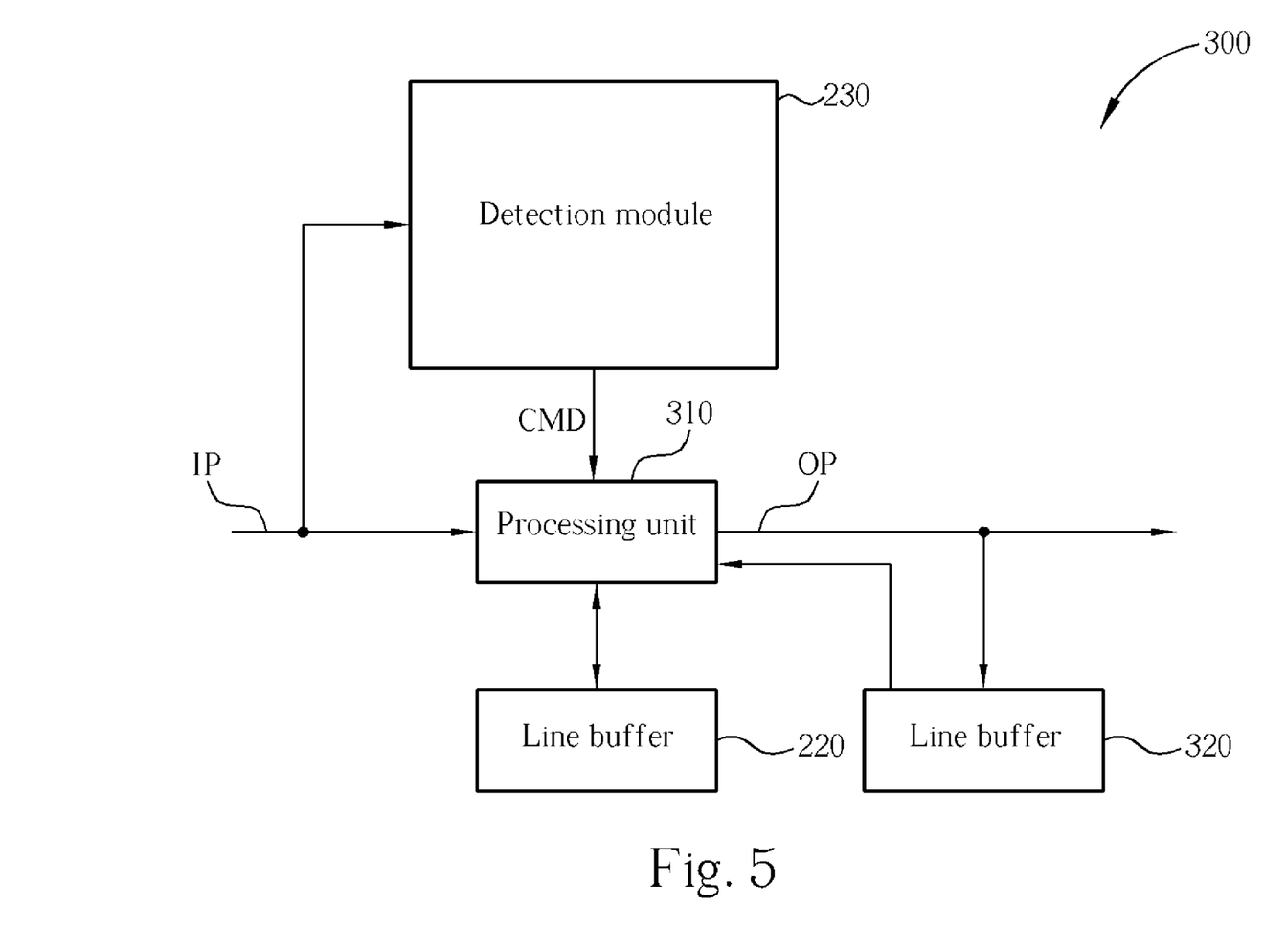
FIG. 5 is a diagram of an image processing circuit according to another embodiment of the present invention.

FIG. 5 is a diagram of an image processing circuit 300 according to a second embodiment of the present invention. In addition to the line buffer 220 and the detection module 230, the image processing circuit 300 further comprises a processing unit 310 and a line buffer 320, where the processing unit 310 is similar to the processing unit 210. The line buffer 320 is capable of temporarily storing the output data carried by the output video signal OP. In addition to processing the input data according to the detection result as mentioned above, the processing unit 310 is capable of further processing other input data carried by the input video signal IP according to the output data, where the other input data comprises pixel values to be processed later. When the line buffer 320 temporarily stores outputted data (e.g. pixel values) in the output video signal OP, the processing unit 310 may process the input video signal IP according to the outputted data in the output video signal OP to generate and output currently outputted data (e.g. pixel values) in the output video signal OP. Thus, in this embodiment, the interpolation operations can be performed according to corrected and outputted pixel values. According to various embodiments of the present invention, by properly designing the plurality of predetermined functions, the interpolation operations can be performed according to corrected and/or uncorrected pixel values.

After the processing unit 310 completes processing a plurality of scan lines, the processing unit 310 derives image data (pixel values) of other scan line(s) from the input video signal IP, where the other input data mentioned above represents the image data (pixel values) of the other scan line(s). For example, if the line buffer 220 is a 5-line buffer and the line buffer 320 is a 1-line buffer, the image processing circuit 300 is capable of processing the image data corresponding to seven scan lines, while the other input data mentioned above represents the next scan line's image data carried by the input video signal IP and transmitted after the image data of the seven scan lines.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit for processing at least one jagged edge in an image represented by an input video signal including input data, the image processing circuit comprising:
   a detection module comprising:
      an edge detector for detecting an edge according to the input video signal and generating a label associated with a specific portion of the input video signal to indicate whether the specific portion corresponds to a detected edge; and
      a jag detector for detecting a jag in the detected edge according to the generated label of the specific portion and a plurality of predetermined patterns, the jag detector configured to generate a detection result;
   a line buffer for temporarily storing the input data; and
   a processing unit, coupled to the detection module and the line buffer, for processing the input data according to the detection result to output an output video signal.

2. The image processing circuit of claim 1, further comprising:
   a second line buffer, coupled to the processing unit, for temporarily storing output data carried by the output video signal;
   wherein the processing unit further processes other input data carried by the input video signal according to the output data.

3. The image processing circuit of claim 1, wherein the edge detector labels the specific portion as a light-to-dark edge, a dark-to-light edge, or a smooth region.

4. The image processing circuit of claim 1, wherein the detection result represents whether the generated label matches a specific predetermined pattern from the predetermined patterns.

5. The image processing circuit of claim 4, wherein the specific predetermined pattern represents a specific pixel value distribution, and the processing unit processes the input data according to the specific pixel value distribution.

6. The image processing circuit of claim 5, wherein the processing unit performs an interpolation operation according to the specific pixel value distribution to reduce or remove a jag of the at least one jagged edge.

7. The image processing circuit of claim 6, wherein the predetermined patterns respectively correspond to a plurality of slopes.

8. An image processing method executed in an image processing circuit for processing at least one jagged edge in an image represented by an input video signal including input data, the image processing method comprising:
   detecting an edge according to the input video signal and generating a label associated with a specific portion of the input video signal to indicate whether the specific portion corresponds to the edge;
   detecting a jag in the detected edge according to the generated label of the specific portion and a plurality of predetermined patterns to generate a detection result;
   temporarily storing the input data; and
   processing the input data according to the detection result to output an output video signal.

9. The image processing method of claim 8, wherein the step of processing the input data according to the detection result further comprises:
   processing the input data by selecting a function from a plurality of predetermined functions according to the detection result to output the output video signal.

10. The image processing method of claim 8, wherein the specific portion corresponds to a pixel region, and the pixel region comprises a plurality of pixels.

11. The image processing method of claim 8, wherein the detection result represents whether the generated label matches a specific predetermined pattern of the predetermined patterns.

12. The image processing method of claim 11, wherein the specific predetermined pattern represents a specific pixel value distribution, and the step of processing the input data according to the detection result further comprises:
   processing the input data according to the specific pixel value distribution.

13. The image processing method of claim 12, wherein the step of processing the input data according to the detection result further comprises:
   performing an interpolation operation according to the specific pixel value distribution to reduce or remove a jag of the at least one jagged edge.

14. The image processing method of claim 8, wherein the predetermined patterns respectively correspond to a plurality of slopes.

15. An image processing circuit for processing an input video signal, the image processing circuit comprising:
   a detection module comprising:
      an edge detector for generating a plurality of labeling values according to values of a plurality of pixels of the input video signal, the labeling values corresponding to the pixels and indicating the existence of a detected edge for a corresponding pixel; and
      a jag detector for detecting whether the labeling values match one of at least one predetermined pattern to generate a detection result, the detection result indicating the existence of a jag;
   a first line buffer for temporarily storing the input video signal; and
   a processing unit, coupled to the detection module and the first line buffer, for processing the input video signal according to the detection result to output an output video signal.

16. The image processing circuit of claim 15, wherein the pixel value difference detector performs an operation on two values of the pixels to generate one of the labeling values.

17. The image processing circuit of claim 16, wherein the pixel value difference detector generates the one of the labeling values according to the difference between two values of the pixels and a threshold value.

18. The image processing circuit of claim 15, wherein the processing unit performs an interpolation operation on a portion of the values of the pixels according to the detection result to generate the output video signal.

19. The image processing circuit of claim 15, wherein any of the labeling values represents a light-to-dark edge, a dark-to-light edge, or a smooth region.

20. The image processing circuit of claim 15, wherein the labeling values represent a pixel value distribution of the pixels.

21. An image processing circuit for processing at least one jagged edge in an image represented by an input video signal, the image processing circuit comprising:
   a detection module configured process the input video signal to detect the presence of a jag in a detected edge of the image, the detection module further configured to output a command that is indicative of the existence of a detected jag;
   processing unit, coupled to the detection module to receive the command, the processing circuit configured to process the input video signal in parallel with the operation of the detection module to smooth a visual effect of the jag, wherein the processing unit processes only portions of the input video signal, in response to the command, corresponding to image portions that have been indicated by the detection module to contain a jag.

* * * * *